(12) United States Patent
Rabinovich et al.

(10) Patent No.: US 7,381,382 B2
(45) Date of Patent: Jun. 3, 2008

(54) WIDE DYNAMIC RANGE MULTISTAGE PLASMATRON REFORMER SYSTEM

(75) Inventors: Alexander Rabinovich, Swampscott, MA (US); Nikolai Alexeev, Moscow (RU); Andrei Samokhin, Moscow (RU); Leslie Bromberg, Sharon, MA (US); Daniel R. Cohn, Chestnut Hill, MA (US); Kamal Hadidi, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 652 days.

(21) Appl. No.: 10/811,669

(22) Filed: Mar. 29, 2004

(65) Prior Publication Data

US 2005/0210877 A1    Sep. 29, 2005

(51) Int. Cl.
B01J 19/08    (2006.01)
(52) U.S. Cl. .............................. 422/186.22; 422/186.04
(58) Field of Classification Search ........... 422/186.22, 422/186.04
See application file for complete search history.

(56) References Cited

U.S. PATENT DOCUMENTS

| | | | |
|---|---|---|---|
| 2,787,730 A | 4/1957 | Berghaus et al. | 315/111 |
| 3,018,409 A | 1/1962 | Berghaus et al. | 315/111 |
| 3,035,205 A | 5/1962 | Berghaus et al. | 315/111 |
| 3,423,562 A | 1/1969 | Jones et al. | 219/121 |
| 3,649,195 A | 3/1972 | Cook et al. | 23/209.4 |
| 3,879,680 A | 4/1975 | Naismith et al. | 331/94.5 |
| 3,992,277 A | 11/1976 | Trieschmann et al. | 204/172 |
| 4,059,416 A | 11/1977 | Matovich | 48/197 |
| 4,339,546 A | 7/1982 | Randalls | 518/704 |
| 4,625,681 A | 12/1986 | Sutekiyo | 123/3 |
| 4,830,492 A | 5/1989 | Ko | 356/313 |
| 4,963,792 A | 10/1990 | Parker | 315/58 |
| 4,967,118 A | 10/1990 | Urataki et al. | 315/56 |
| 5,095,247 A | 3/1992 | Hanamura | 315/111.21 |
| 5,138,959 A | 8/1992 | Kulkarni | 110/346 |
| 5,425,332 A | 6/1995 | Rabinovich et al. | 123/3 |
| 5,437,250 A | 8/1995 | Rabinovich et al. | 123/3 |

(Continued)

FOREIGN PATENT DOCUMENTS

EP    0 423 370    4/1991

(Continued)

OTHER PUBLICATIONS

U.S. Appl. No. 10/411,917 to Rabinovich et al., filed Apr. 11, 2003, entitled "Plasmatron Fuel Converter Having Decoupled Air Flow Control."

Primary Examiner—Kishor Mayekar
(74) Attorney, Agent, or Firm—Choate Hall & Stewart, LLP; Sam Pasternack (57) ABSTRACT

A method and apparatus for a multistage plasmatron fuel reformer system having a wide dynamic operational range. In one aspect, the system includes a plasmatron configured for low flow operation followed by a reaction extension cylinder and then by a nozzle section capable of providing additional air and/or fuel inputs. The nozzle section is then followed by another reaction extension region. When high flow rate of the system is needed, the low fuel flow rate provided by the plasmatron followed by the first reaction extension region provides the high temperature used to effectively initiate the partial oxidation reaction in the next section. The initiation of this reaction may also be facilitated by the presence of hydrogen.

26 Claims, 7 Drawing Sheets

U.S. PATENT DOCUMENTS

| | | |
|---|---|---|
| 5,560,890 A | 10/1996 | Berman et al. ......... 422/186.04 |
| 5,653,895 A | 8/1997 | Shintani .................. 219/121.5 |
| 5,852,927 A * | 12/1998 | Cohn et al. ................... 60/780 |
| 5,887,554 A | 3/1999 | Cohn et al. ...................... 123/3 |
| 6,012,326 A | 1/2000 | Raybone et al. ....... 422/186.21 |
| 6,284,157 B1 | 9/2001 | Eliasson et al. ............ 252/373 |
| 6,322,757 B1 | 11/2001 | Cohn et al. ............ 422/186.04 |
| 2003/0221949 A1 | 12/2003 | Rabinovich et al. ........ 204/164 |

FOREIGN PATENT DOCUMENTS

| | | |
|---|---|---|
| EP | 0 605 010 | 7/1994 |
| WO | WO 01/33056 | 5/2001 |

* cited by examiner

WIDE DYNAMIC RANGE MULTISTAGE PLASMATRON REFORMER SYSTEM

FIELD OF THE INVENTION

The present invention is directed to the field of fuel reforming and more particularly to a method and apparatus for a wide dynamic range multistage plasmatron reformer system.

BACKGROUND OF THE INVENTION

Plasmatron fuel converters or reformers ("plasmatrons") reform hydrocarbons to generate a hydrogen rich gas which includes hydrogen and carbon monoxide through the use of plasma discharges. (See, for example, U.S. Pat. No. 6,322,757 to Cohn et al.; U.S. Pat. No. 5,887,554 to Cohn et al; U.S. Pat. No. 5,437,250 to Rabinovich et al; and U.S. Pat. No. 5,425,332 to Rabinovich et al.; and U.S. Pat. No. 6,793,899 to Bromberg et al, the teachings of all of which are incorporated herein by reference). Plasmatron fuel conversion using low current, high voltage discharges can provide significant advantages. (For a general treatise on plasma physics, see J. Reece Roth, Industrial Plasma Engineering, Vol. 1 and 2, Institute of Physics: Bristol, UK, 1995; for other examples of devices utilizing plasma technology, see U.S. Pat. Nos. 2,787,730; 3,018,409; 3,035,205; 3,423,562; 4,830,492; 4,963,792; and 4,967,118, the teachings of all of which are incorporated herein by reference).

Applications that require hydrogen onboard vehicles span a large range of flow rates. While at high engine loads, large hydrogen rich gas volumes are required (with corresponding high fuel flow rates through the plasmatron fuel reformer). Because of the infrequent operation of light duty vehicles in this regime, the operational characteristics of a fuel reformer at these high flow rates are less demanding than at lower flow rates. Thus the hydrogen conversion efficiency, defined as ratio of hydrogen flow in the reformate to hydrogen content in the fuel, and reformer power efficiency, defined as power content in the reformate to that in the fuel to the reformer, are not key requirements at these high flow rates. More importantly is the hydrogen conversion efficiency and the reformer power efficiency at low flow rates, where the flows are not large, but where the engine operates a large fraction of the time.

In addition to warm operation at low loads (which requires low fuel flow rates through the plasmatron), it is desirable to have low flow rates through the cold start period of engine operation. In order to minimize hydrocarbon emissions during a cold start period, operation in mainly reformate would be desired. However, because of the short duration of the cold start period, energy efficiency is not particularly important.

Generally, low current plasmatron systems known in the prior art operate at a fuel flow rate on the order of 1 g/s and produce on the order of 40 kW of reformate power. The dynamic range is about a factor of 3, which would be from 13 to 40 kW for a typical plasmatron. In plasmatrons having multiple air inputs (such as plasma stretching air, atomization air and wall protection air), the different requirements for these inputs may further limit the dynamic range. For example, for a fuel flow rate of ~1 g/s and an Oxygen/Carbon (O/C) ratio of ~1, the plasma air flow rate is preferably ~90 liters per minute, the atomization air ~57 liters/min, and the wall protection air ~115 liters/min. For a fuel flow rate of ~0.1 g/s and O/C~1, the plasma air flow rate is preferably ~15 liters/min, the atomization air ~10 liters/min, and the wall protection air flow rate is at zero. At these parameters, fuel atomization and initiation of reforming in the plasmatron can be degraded and soot production increased. By providing a plasmatron fuel reformer system having a wide dynamic range, improvements are possible in fuel injection (at both high and low range), air injection (at both high and low range) and power supply requirements, which ideally may be varied with air/fuel flow rate and conditions.

Accordingly, there is a need for a plasmatron reformer system capable of wide dynamic range operation which is of particular importance for use with vehicular gasoline engines which operate over a wide fuel flow range.

SUMMARY OF THE INVENTION

A method and apparatus are disclosed for a plasmatron fuel reformer system having a wide dynamic operational range. The present invention also relates to low flow rate embodiments of hydrogen generators and, in particular, low flow rate operation of plasmatron fuel reformers for applications on board vehicles.

In one aspect of the present invention, a fuel reformer system is provided that includes a plasmatron configured for low flow operation followed by a reaction extension cylinder and then by a nozzle section capable of providing additional air and fuel inputs. The nozzle section is followed by another reaction extension region. When a high flow rate of the system is needed, the low fuel flow rate provided by the plasmatron followed by the first reaction extension region provides the high temperature used to effectively initiate partial oxidation reactions in the next section. The initiation of this reaction may also be facilitated by the presence of hydrogen.

In another aspect, the invention provides for a plasmatron fuel reformer system having multiple air/fuel heads upstream from a single discharge region, the heads incorporating air and fuel nozzles. By operating more than one head at a time or by operating discrete controls for air and fuel flow rates, it is possible to provide continuous adjustment of fluid flow over a wide dynamic range.

In yet another aspect, the invention provides for a method of fuel reforming, including: providing fuel and air to a plasma discharge region in a plasmatron fuel reformer; establishing a plasma discharge in said plasma discharge region to initiate a reaction; extending said reaction in a first reaction extension region; establishing a fluid input downstream from said first reaction extension region; and extending said reaction in at least one additional reaction extension region.

BRIEF DESCRIPTION OF THE DRAWING

The invention is described with reference to the several figures of the drawing, in which.

DETAILED DESCRIPTION OF THE VARIOUS EMBODIMENTS

Robust, large volume plasma discharges are needed for fast start-up of low current, low electrical power plasmatron fuel reformers ("plasmatrons") and for efficient operation after start-up. Using an appropriate electrode configuration, the rapid establishment, extinction and reestablishment of the plasma discharges, combined with initiation of persistent chemical reactions by the flux of active species generated by the discharge, result in a quasi-continuous plasma discharge. The quasi-continuous plasma discharge effectively fills the discharge region and initiates chemical reactions throughout that volume.

One application of plasmatrons involves partial oxidation of hydrocarbon fuels to produce hydrogen-rich fuels for use in internal combustion systems such as gasoline or diesel engines and their associated exhaust systems. Such plasmatrons may be selected for operation between stoichiometric partial oxidation and full combustion depending on conditions and applications (one can also run it at O/C<1). During full combustion, the output of the plasmatron is a hot gas that is no longer hydrogen-rich. Electrical power for operation of the plasmatron will preferably be provided by components of the internal combustion system.

Generally, plasmatrons will provide average electrical power to the plasma in range of between 10 and 1000 watts. The electrical power consumption is generally between 0.3% to 10% of the thermal power content of hydrogen-rich gas produced by the plasmatron. The cycle frequency necessary to provide a quasi-uniform plasma discharge can be provided by the selection of various electrical and fluid dynamic characteristics of the plasmatron. The power supply frequency is adjusted in the range of 100 Hz to 2 MHz. By controlling the electrical and thermodynamic parameters of the plasma, the operation of this plasmatron fuel reformer can be selected for high energy conversion efficiency and for selectivity in the chemical processes initiated by the volumetric ignition.

According to one embodiment of the present invention, wide dynamic range is attained by using a multistage system where the first stage is a plasmatron configured for low flow operation. This component can be used by itself to provide low levels of hydrogen-rich gas. When higher levels of hydrogen-rich gas are needed, the hot product gas from the first stage plasmatron can be used to initiate reforming in a second stage reforming section (or reaction extension section). This second stage does not itself include a plasmatron.

In contrast to the first stage, the second stage can be designed without the constraints on aperture imposed by the need for plasma coverage, on plasma stretching air and on air needed for fuel atomization. It can thus be optimized for high fuel flow rate. Moreover, because of the hot, high enthalpy environment produced by the gas produced by the first stage, fuel atomization requirements in the second stage can be reduced. As a consequence the pressure requirement for atomization could be reduced by a factor of three or more. This can substantially reduce total air pumping requirements. Other stages and sections may be added, including a nozzle section to establish additional air/fuel flows as well as other reforming stages.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

Figure 1:
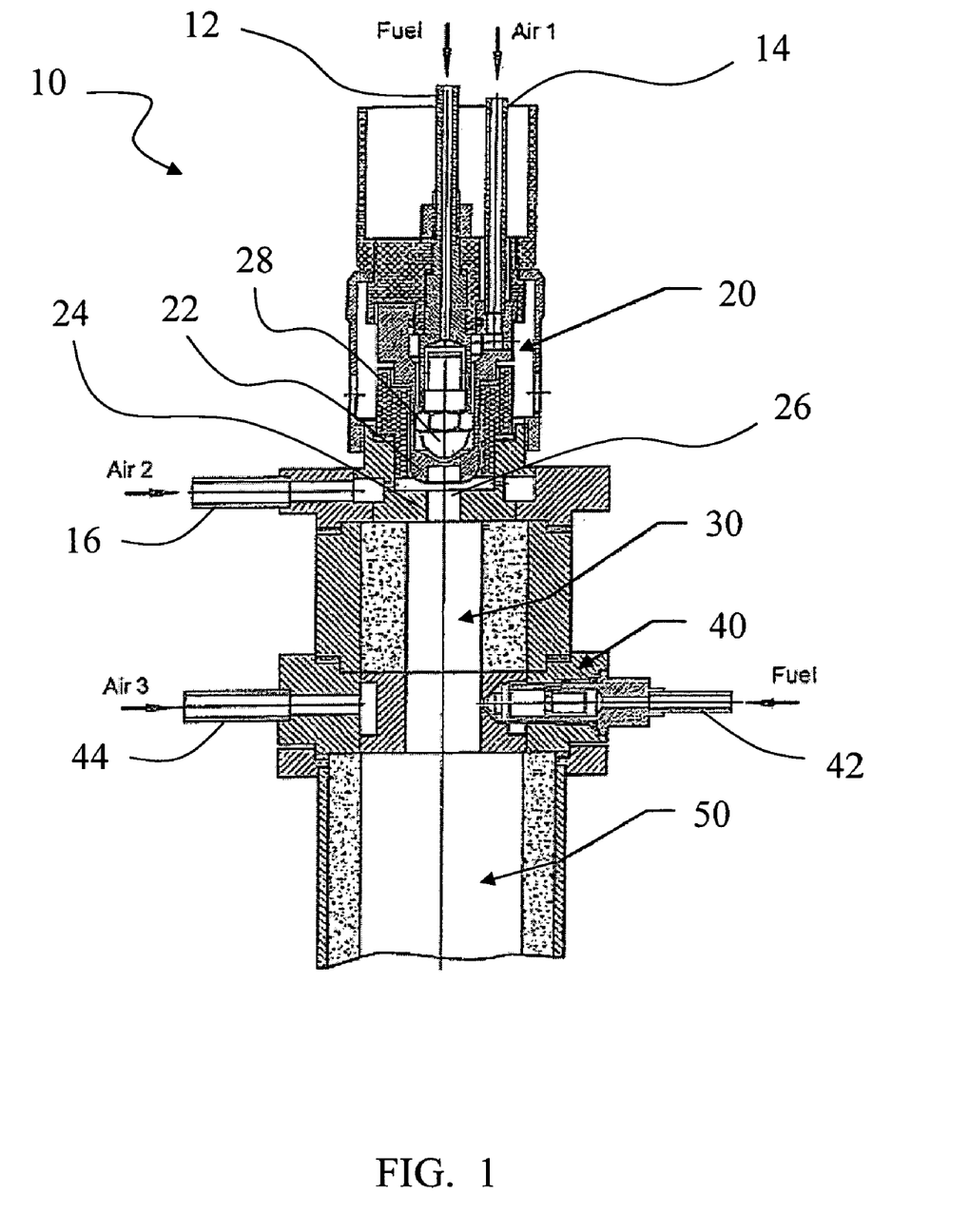
FIG. 1 is a schematic illustration of a plasmatron reformer system having wide dynamic range operation according to one embodiment of the invention.

In one embodiment, as illustrated in FIG. 1, a multistage plasmatron reformer system 10 is shown that achieves wide dynamic range operation. The plasmatron reformer system 10 includes, as part of a first stage, a low flow operation plasmatron 20 with mechanisms for fuel input 12, atomization air input 14 and plasma stretching and shaping air input 16. In one embodiment, the plasma stretching air may be injected into the plasma region with a large tangential velocity component to generate swirl and may be injected at multiple angles. Other inputs are also possible, for example, a wall protection air input may be included. Generally, a plasmatron includes two electrodes 22, 24 disposed to form a plasma discharge region 26. The system may include one or more nozzles 28 (or other channels) through which fuel and air are injected into the plasma discharge region 26 in a controllable manner. Further, the system may include two or more electrodes, for example, 3 electrodes with 3 phase. Multiple plasmatron configurations are contemplated herein, and it is recognized that selection of various geometries of electrode configurations and various geometries for mechanisms introducing fuel and air into the plasma discharge region will provide varying conversion efficiencies and chemical selectivity. For example, the electrodes may be configured as parallel ring electrodes, parallel rod electrodes and dual co-axial cylinder electrodes in which one cylindrical electrode has a greater inner bore diameter than the outer diameter of the other electrode. Further, the fuel and air inputs may be combined in various configurations and/or be designed to operate independently of one another and be therefore decoupled from one another. The air and fuel inputs may also be positioned to deliver fluid within the plasmatron in various configurations, for example, with multiple concentric inputs oriented around the circumference of the plasma discharge region or a reaction extension region. Further, as noted herein, multiple injection angles to vary the swirl in the plasma region and beyond are also contemplated.

The multistage plasmatron reformer system 10 further includes a first reaction extension cylinder or region 30 following the plasmatron 20. A first stage reforming section of the system may include the plasmatron 20 or the plasmatron 20 and the reaction extension region 30. A nozzle section 40 having additional fuel 42 and air 44 inputs is connected downstream from the first reaction extension region 30. This nozzle section 40 is then followed by another reaction extension region 50. The nozzle section 40 and/or the second reaction extension region 50 may comprise the second stage reforming section. The low flow rate plasmatron 20 followed by the first reaction extension region 30 provides the high temperature (at least 900° C.) needed to effectively initiate the partial oxidation reaction in the next stage. The initiation of this reaction may also be facilitated by the presence of hydrogen generated in regions 20 and 30. The nozzle section 40 and second reaction extension region 50 provide control of the air and fuel flow rates and increase the residence time of the reactants in a hot zone for substantially completing the reaction to produce hydrogen-rich gas more efficiently.

In one embodiment, the wide dynamic range plasmatron system operates with a fuel flow rate range of ~0.1 g/s to 1 g/s. With operation at a low fuel flow rate, the plasmatron operates at a fuel flow rate of ~0.1 g/s, a plasma air flow rate of at ~15 liters/minute and an atomization air flow rate of ~10 liters/min (for O/C~1). Appropriate atomization of low fuel flow rate is provided by commercially available nozzles, such as the B37 nozzle. When it is desired to increase the total fuel flow rate in the first stage, the plasma air flow rate can be increased to up to ~60 liters/min. The increased plasma air flow may be introduced through a second set of bigger diameter tangential holes to prevent the higher pressure drop. The diameter of the plasma air holes may be adjusted so that the air velocity of the plasma air is on the order of 30-100 m/s, in order to generate appropriate swirls for preferred operation of the device. Thus, for plasma air flow rates of 15 liters/min, 6 holes with a diameter of 0.05 in arranged for tangential air injection are typical of wide range plasmatron fuel reformers.

The first stage of the wide dynamic range plasmatron is a low flow rate fuel converter. Good operation has been demonstrated at fuel flow rates as small as 0.1 g/s. In addition to proper air preparation, as described above, good fuel preparation is required. In particular, the distance between the fuel nozzle and the plane of the discharge is very important. This distance is much smaller in the case of a low fuel flow rate plasmatron than in the case of a higher fuel flow rate plasmatron. At the low fuel flow rates, the optimal distance is about 0.2 in, while it is about 1 in for the case of the 1 g/s and greater fuel flow rates. It is desirable to operate the first plasmatron with a stratified air-fuel mixture, since tests with premixed air-fuel resulted in decreased plasmatron fuel reformer performance.

Using both the first and second stage reforming regions, it is possible to obtain an overall dynamic range of a factor of 10 and potentially up to a factor of 30 or more. Further, at each stage of the plasmatron reformer system, the O/C ratio may be adjusted as desired, for example, an O/C~3 (full combustion) at the plasmatron fuel reformer stage and an O/C~1 in one or more of the downstream reaction extension regions.

In another embodiment, for the plasma air flow rate, six tangential channels are used. For a plasma air flow rate of ~15 liters/min (O/C~1) the channels have diameters of 0.04 in (1 mm) each, while for a plasma air flow rate of ~60 liters/min (O/C~3) the channels have diameters of 0.12 in (3 mm) each. The change from one set of channels to another could be achieved by using a solenoid valve. Controlling fuel and air flow rates at different stages in the plasmatron fuel allows optimization of the system. For example, at the first stage plasmatron section, flow rates that are too high or too low prevent the plasma from mixing through the plasma discharge region (i.e. the plasma stays along the wall of the plasma discharge region). However, in the additional stages, the flow rates can be controlled to increase or decrease residence times in ranges that extend beyond the narrow range that is preferable during the plasmatron stage. Accordingly, controlling flow rates within the different stages is advantageous to system operation. Another desirable consequence of the flexibility of injecting air at various points is that the turbulence, and also the mixing, can be varied along the fuel reformer. Thus, it is important to have fuel stratification in the plasma zone, followed by appropriate mixing to distribute and propagate the fuel reformation. It has been estimated that low mixing results in decreased hydrogen production, while very strong mixing prevents the development of the initial stages of reforming (which are exothermic), again decreasing the conversion. Thus, achieving proper mixing is important. Because of the operation at large dynamic range, a mechanism for controlling the turbulence and mixing may desirably be provided.

Experimentally it has been demonstrated good energy conversion efficiency (75%) at the low flow rate, to about 58-65% energy conversion efficiency at the higher flow rates. It may be possible to increase the energy conversion efficiency at the higher flow rates, but as previously mentioned, good energy conversion efficiency is required to avoid negative impacts in the overall vehicle gas mileage.

Figure 2:
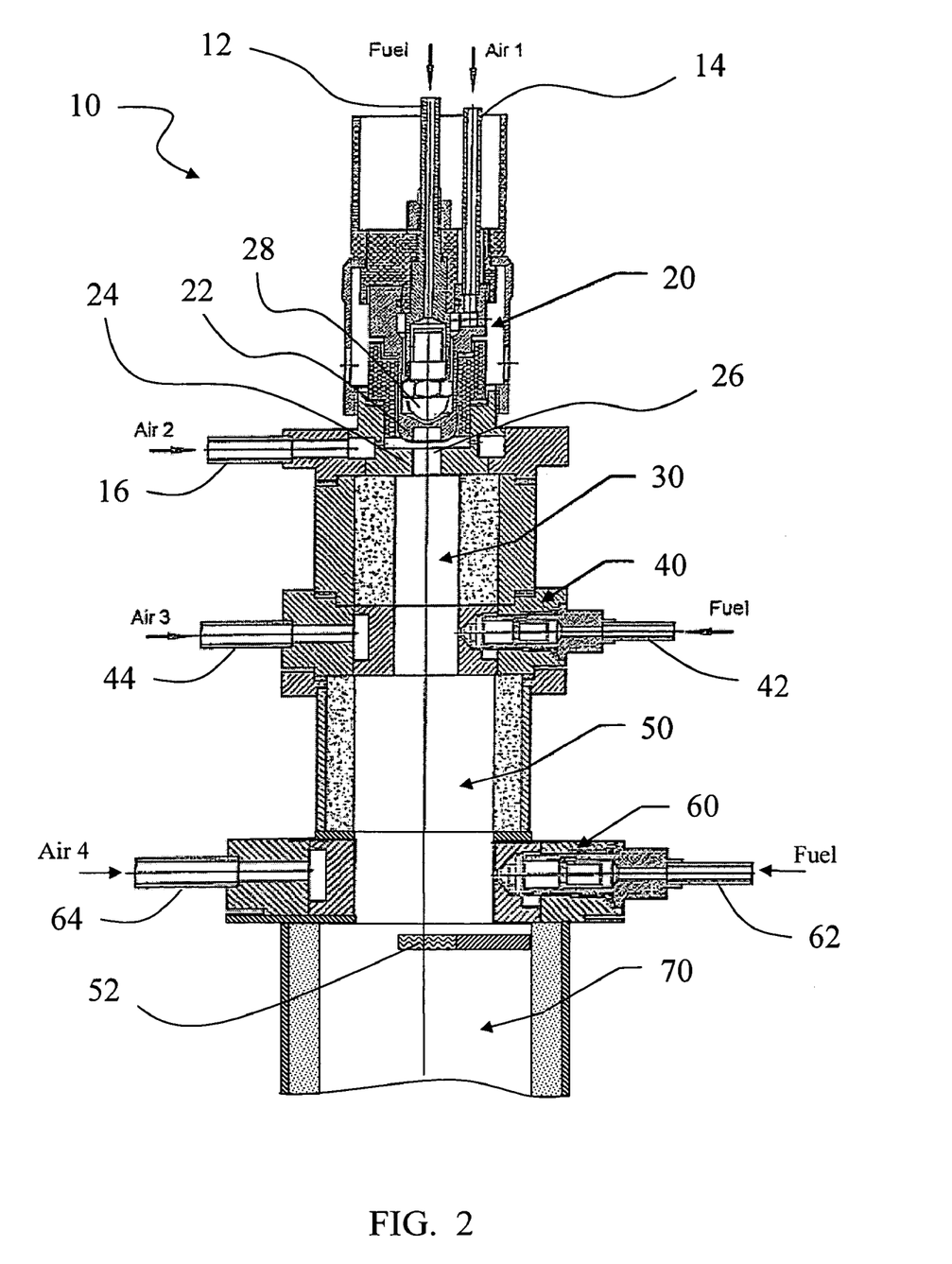
FIG. 2 is a schematic illustration of a plasmatron fuel reformer system having multiple nozzle sections and additional reaction extension cylinders connected downstream according to one embodiment of the invention.

The temperature for adequate operation of the second stage (900° C. to 1200° C.) can be obtained by operation of the first stage at O/C between 1 and 7 (if one operates the first stage at combustion (i.e. O/C~3 or higher), then the second stage should operate at O/C<1 in order to achieve overall O/C=1). The rest of the air and fuel to achieve a higher flow rate at an overall O/C~1 could be introduced through the nozzle section 30 or several nozzles downstream from the plasmatron. In another embodiment, the two stage concept may be extended to more stages with reaction extension cylinders of increasing length and diameter. In this way very high reformate production levels could be achieved. FIG. 2 is a schematic illustration of a plasmatron fuel reformer system having multiple nozzle sections and additional reaction extension cylinders. An additional nozzle section 60 having additional fuel 62 and air 64 inputs and an additional reaction extension region 70 are connected downstream to provide additional control of the air and fuel flow rates according to this embodiment of the invention. As shown in FIG. 2, the third reaction extension region 70 has a larger diameter than the previous reaction extension region. It should be noted that the partial oxidation reaction is exothermic, such that heat from the reaction maintains the necessary temperature for the reforming process even in the later stages downstream from the plasmatron 20.

For intermediate fuel flow rates, it is not necessary to increase the plasma air flow rate in order to provide the temperature needed for effective initiation of partial oxidation reactions in the second stage. The operation at a lower O/C ratio is sufficient. In this case, the plasmatron could always operate at the same steady state plasma air and fuel mode, which significantly simplifies system operation.

It has also been demonstrated that mixing downstream from the second stage is generally poor, determined by the presence of free oxygen in the reformate even at high temperatures. The multiple stage plasmatron fuel reformer system can be enhanced by the use of strong mixing within or downstream from the second stage. This can be achieved by the use of mixing vanes and other turbulizers 52 causing perturbations of the flow that result in increased turbulence. In this manner, high efficiency conversion of the liquid fuel can be achieved, with uniform temperature, good liquid fuel conversion and low free oxygen present.

Turbulizers 52 can be used to vary the turbulence and mixing at different flow rates, as the velocities increase with increased flow rate. Although the use of surfaces to achieve this purpose can be done, as with turbulizers, it is preferable to use hydromechanical means for mixing. One reason for the advantage for hydrodynamical mixing is that soot could be formed on a hot surface that intersects the air fuel flow. Methods of inducing turbulence in the flow can be achieved through appropriate injection of the air/fuel mixtures. The use of multiple injection points with different flow characteristics can be used to achieve this mixing. For example, if the downstream flows are injected such that they induce a swirl that is opposite to the upstream flow, large shears in the flow velocity are created that result is efficient mixing through the generation of eddies that mix the counterswirling flows.

Figure 3:
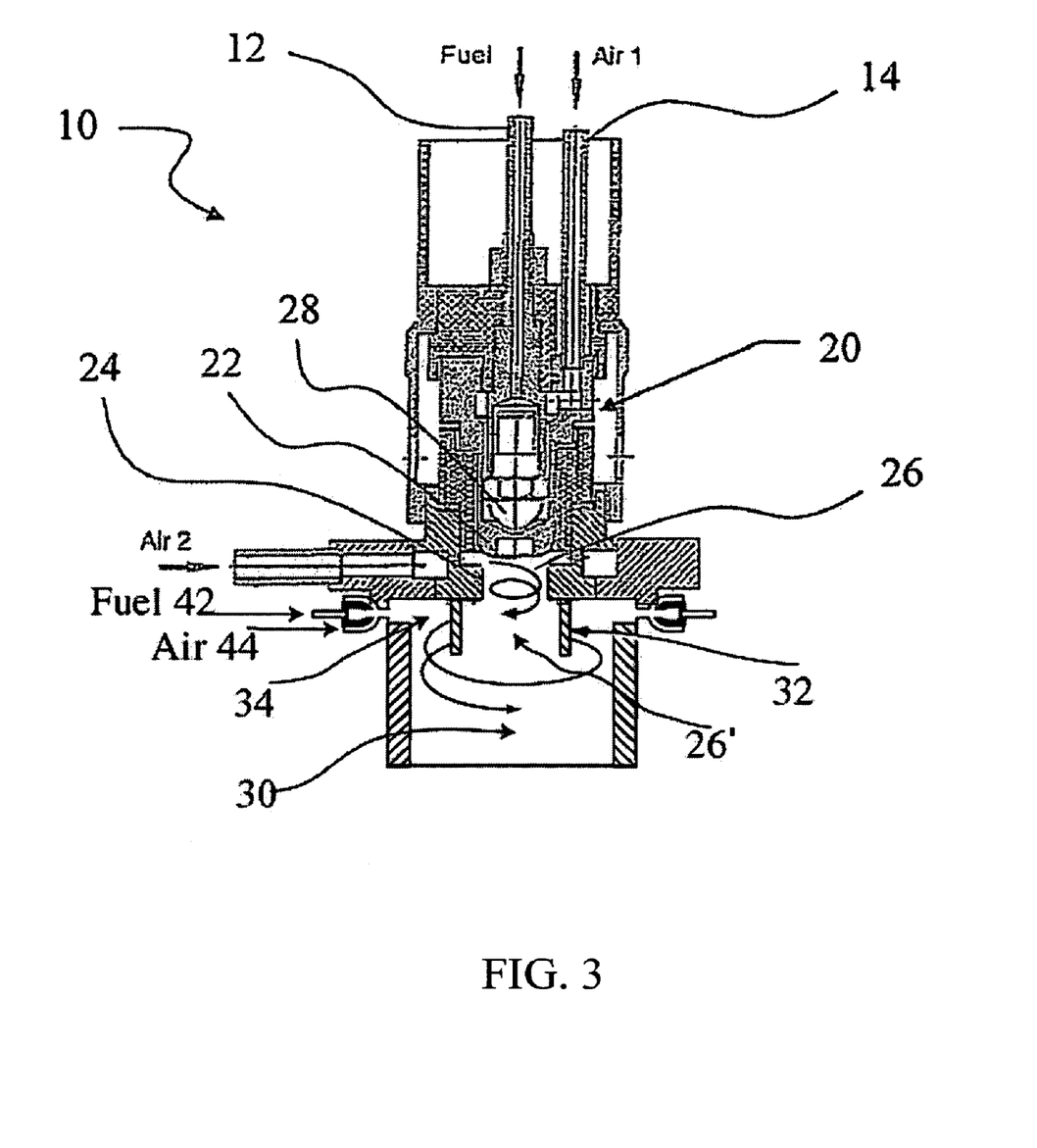
FIG. 3 is a schematic illustration of a plasmatron fuel reformer system with multiple flow chambers and a flow separator element disposed between the flows from the first and second stages for separate flow development prior to combination of the two flows according to one embodiment of the invention.

FIG. 3 shows a variation of the air/fuel injection, where air and fuel mixtures introduced through air 44 and fuel 42 inputs of a supplemental nozzle section are allowed to develop into a well developed flow in a chamber or region 34 prior to introduction into the main flow. The flow from the plasmatron 20 is swirled in region 26 by air introduced from inputs 16. It is desirable for the flow in reaction extension region 30 to have an opposite swirl to that of the region 26. The approach shown in FIG. 3 decreases the recirculation flow that occurs when a flow enters a larger duct, as in between the reaction extension cylinder of the first stage and the second stage in FIG. 2. The mixing due to this recirculation flow is replaced in FIG. 3 by mixing arising from the difference in the swirl motion of the flow from the first stage and the air/fuel mixture in the second stage. The mixing and turbulence can be controlled by the flows coming from the first stage and the flows in the air/fuel injection in the second stage.

An additional advantage of the embodiment shown in FIG. 3 is that the flow from region 26 can be preheated internally by thermal contact through the common separator element 32, which not only serves as a separator of the flows in regions 26 and 34 but could be used as a vaporizer (if droplets from fuel reach it) or as a preheater of air. In the embodiment shown, the separator element 32 may also form a subsidiary reaction extension region 26' before the swirled flow from the plasmatron is combined with the flow from chamber 34 in the counterswirled main flow of reaction extension region 30.

Figure 4:
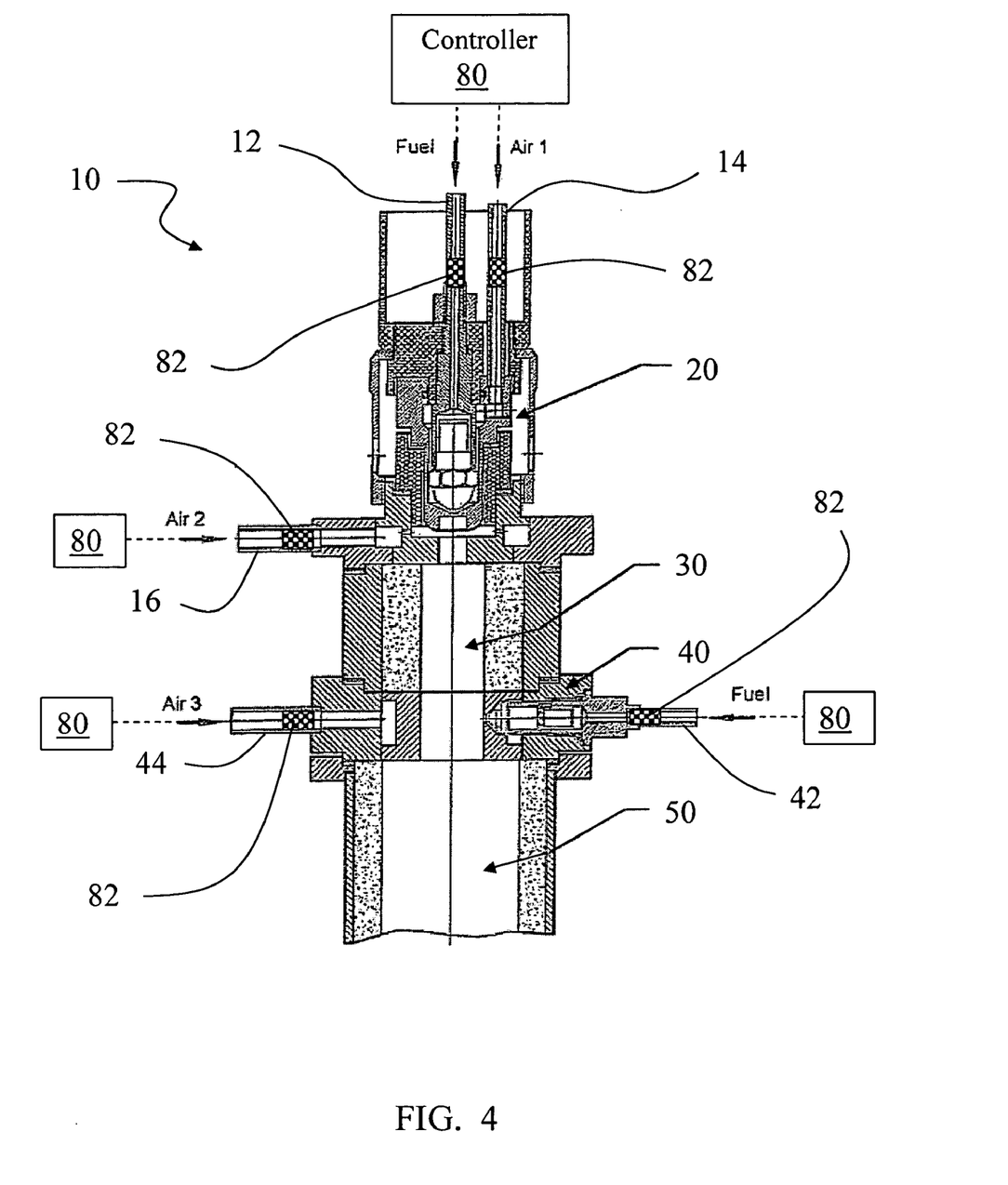
FIG. 4 is a schematic illustration of mechanisms for controlling air and fuel flow rates in the plasmatron reformer system according to one embodiment of the invention.

FIG. 4 illustrates mechanisms for controlling air and fuel flow rates in the plasmatron reformer system according to various embodiments of the invention. The operation of the plasmatron reformer system 10 could be carried out by fully adjustable by fuel and air controllers 80 (either controlled via pulse width modulation or through proportional valves) or stepwise adjustable achieved with solenoid valves 82 incorporated into the air and fuel input tubes. The average electrical power needed by the actuating solenoids can be reduced by a design in which the maximum power is needed only for the highest flow rate operation.

Figure 5:
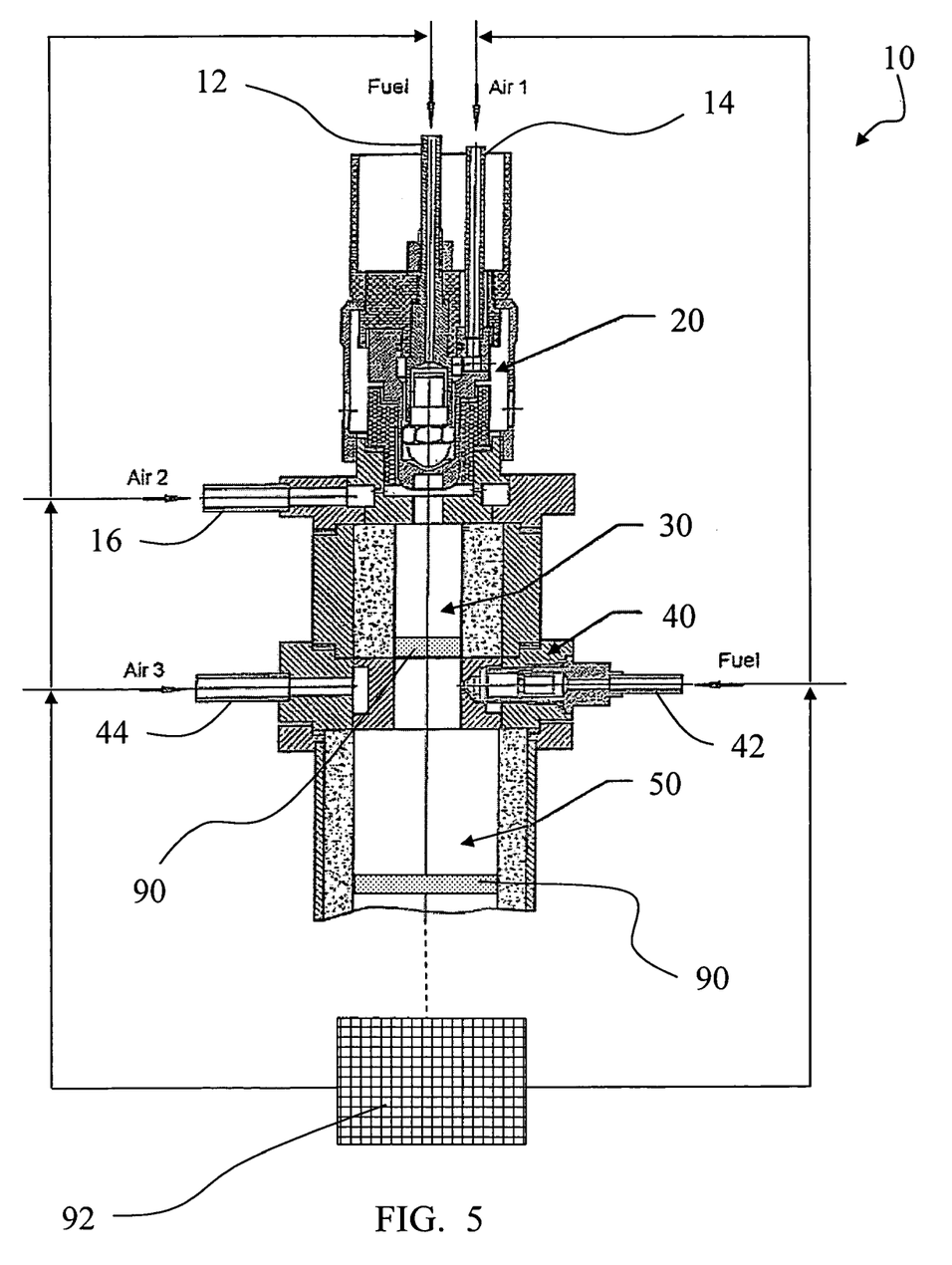
FIG. 5 is a schematic illustration of catalysts and a heat exchanger positioned within the plasmatron reformer system according to one embodiment of the invention.

The multistage plasmatron reformer could be configured in a number of different ways. Catalysts may be used in one or both of the reaction extension region stages. Use of a catalyst in a first stage could increase the temperature and the amount of hydrogen, but the high temperature may limit the options of the catalyst used in between stages. A heat exchanger may also be incorporated to preheat the fuel and air inputs. FIG. 5 is a schematic illustration of a plasmatron fuel reformer system having catalyst 90 positioned within the reaction extension regions and a heat exchanger 92 to preheat the fuel and air inputs.

In another embodiment of the invention, the plasmatron portion of the system may provide a constant fuel flow rate and an adjustable air flow rate. The first reaction extension region may have a length in the range of approximately 2 cm to approximately 8 cm and a diameter in the range of approximately 2 cm to approximately 6 cm. At a fuel flow rate of about 0.1 g/s and an air flow of about 25 liters/min, a residence time of only 1-5 ms is provided for the reaction in the first extension region. In order to increase the residence time so that a more complete reaction can occur, the supplemental nozzle stage downstream from the first reaction extension region allows the fuel flow rate to be adjusted.

Using two stages, a dynamic range of 0.1 to 2 g/s fuel flow has been demonstrated corresponding to hydrogen-rich gas outputs of 4 kW to 80 kW. Additional capability could be provided by increased injection in the second stage, or by the use of additional stages.

There are a number of design and operational advantages if the first stage in the plasmatron is exclusively operated at one low fuel flow rate or at a limited range of flow rates. The electrode gap may be enhanced to reduce the air pressure needed to stretch the plasma. The electrode gap may also be enhanced to reduce the high voltage requirement. This can be especially important for high pressure operation desired for application to pressure boosted engines, i.e. supercharged or turbocharged engines, when the plasmatron fuel reformer is operated downstream from the turbocharger/supercharger. The electrical power supply requirements can be reduced since the required power is lower and less power variation is required. This is particularly important for the low flow rate operation, where minimization of the electrical power requirement is very important in order to reduce the adverse effect of the parasitic electrical load.

Figure 6:
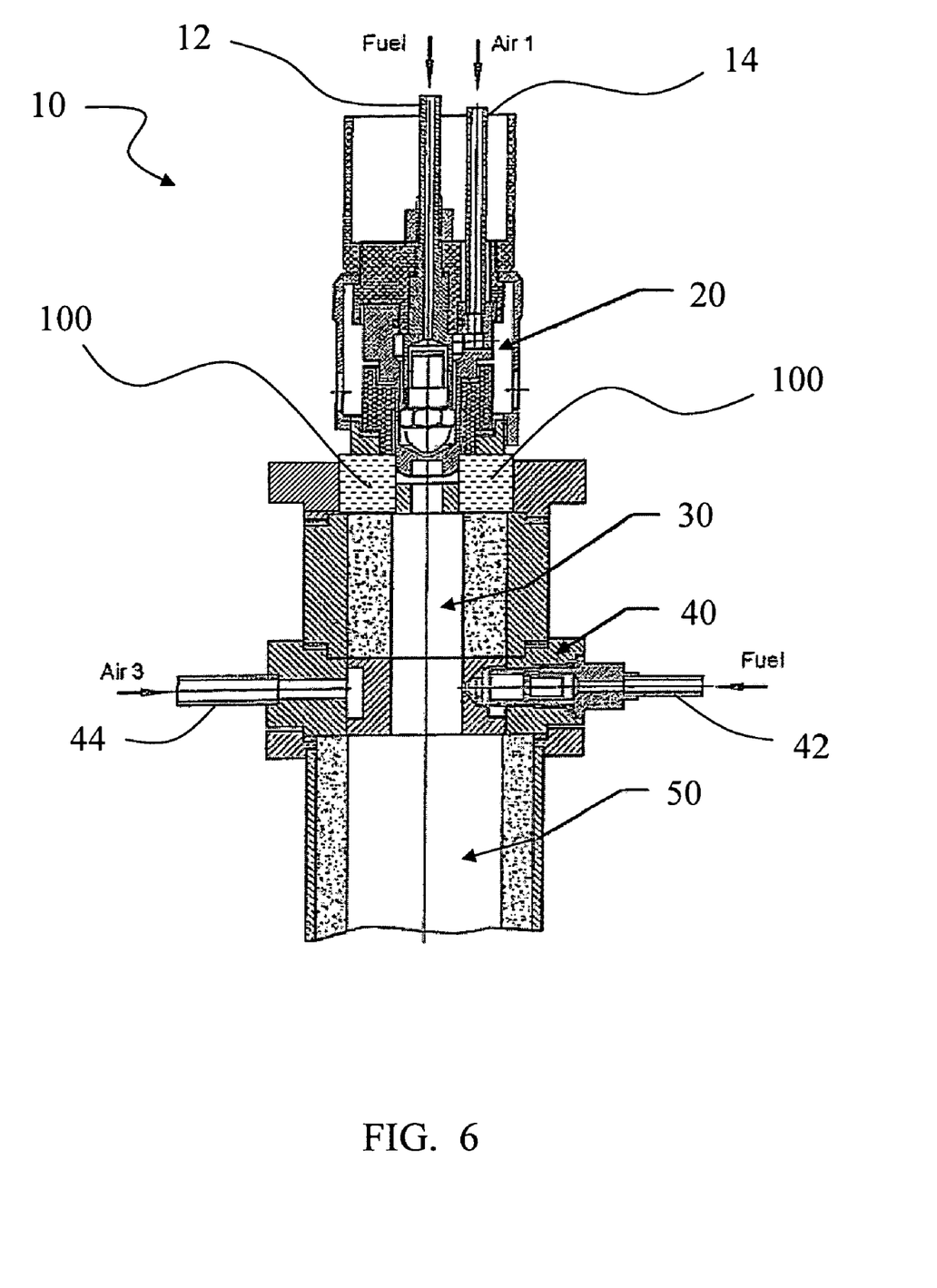
FIG. 6 is a schematic illustration of a plasmatron fuel reformer system having a magnetic coil for shaping the plasma according to one embodiment of the invention.

In another embodiment, the pressure requirement for stretching the plasma may be further reduced by use of a magnetic field both to spin the plasma and push it inward. A magnetic field is used in place of the plasma shaping air flow to control and shape the plasma within the plasma discharge region of the plasmatron. Such a configuration allows further decoupling of the plasma shaping mechanism from the overall flow rates and can be advantageous to the operation of the system. In one embodiment, as shown in FIG. 6, a magnetic coil 100 is installed around the plasma discharge region 26 of the plasmatron 20 and a rectified current is applied that is capable of shaping the plasma. The current should be unipolar (rectified) so that the Lorenz force generated on the discharge has a net force that spins the discharge, always in the same direction. If the current were not unipolar, at the high frequencies of operation the net force would be 0. For an unrectified current to have a net force, the magnetic field would be to be varied at the same frequency in a synchronous manner. A magnetic field strength of approximately 1 kilogauss could be used to perform the plasma shaping function.

Figure 7:
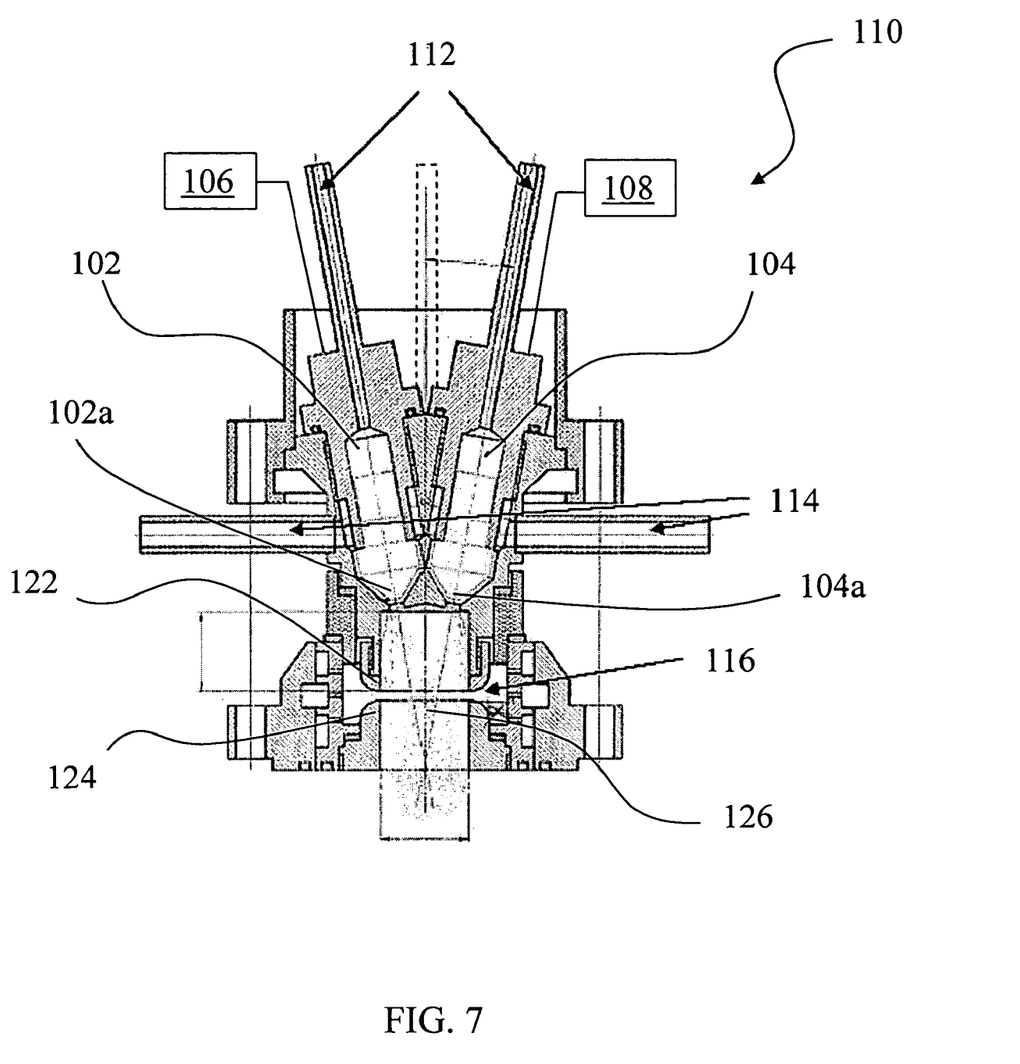
FIG. 7 is a schematic illustration of a plasmatron fuel reformer system having multiple air/fuel heads upstream from a discharge region, the heads incorporating air and fuel nozzles.

In yet another embodiment, the fuel reformer could have multiple injection regions of air and fuel. FIG. 7 shows an embodiment of a plasmatron reformer system 110 having several air/fuel heads 102, 104 upstream from a single plasma region 126 disposed between electrodes 122 and 124. The multi-head system 110 includes fuel inputs 112, atomization air inputs 114 and plasma shaping and stretching air inputs 116 that inject fluid into the plasma region 126. The tested unit included 3 heads with 3 different size fuel nozzles and 3 different diameters of the tangential channels for air injection (see injection elements 102a and 104a) (the third fluid head is outside of the plane of FIG. 6 and is indicated by a dotted line). In one embodiment, the flow axes of the fluid heads 102, 104 are each tilted at an angle of approximately 10 degrees as compared with an overall flow axis of the plasmatron reformer system 110. Each head has a limited operating dynamic range. By operating each head at distinct times it is possible to provide continuous adjustment of the flow over a wide range. In another embodiment, each head includes independent controls 106, 108 for discrete operation of air/fuel flow rates thereby providing a multitude of operating air/fuel flow rates by combining several heads at the same time. Although tests were carried out with three heads, other numbers of air/fuel fluid heads are contemplated herein.

In this embodiment, when lower or higher air-fuel flow rates are required, solenoid valves open inputs for fuel, atomization air and plasma air. At the same time unnecessary inputs are closed. This design provides wide dynamic range of hydrogen rich gas production.

In yet another embodiment, the first stage may be used to preheat the fuel or the air during the cold start period of the vehicle. It is possible to operate the first stage at oxygen-to-carbon ratios higher than 1 to full combustion, while injecting mainly fuel in the second stage in order to vaporize the fuel and reduce engine-out emissions of hydrocarbons. The first stage can provide full combustion (which is easier to ignite during the cold start) with injection of fuel in the second stage. Under other environmental conditions, it is possible to operate the first stage closer to partial oxidation, producing hydrogen rich reformate. This reformate can be used as the whole fuel or it can be augmented by injection of additional fuel in the second stage.

Alternatively, it is possible to use air injections in the second stage. In this case, it is the air going to the engine that is preheated. The air/reformate mixture temperature can be adjusted by controlling the flow rates in the first stage, the O/C ratio in the first stage, and the air injection in the second stage.

It is also possible to inject both fuel and air in the second stage, but under conditions where mixing is poor due to low turbulence in the reaction extension cylinder downstream from the second stage. In this manner it is possible to have hot air and hot fuel next to each other when reacting. This mixture can then be injected into the cylinder and combusted there. Poor mixing could occur at conditions of low flow, corresponding to requirements during cold start.

Further, the plasmatron reformer system may be configured for operation with diesel fuel or any other liquid hydrocarbon such as vegetable oils (canola oil, corn oil, soybean oil, etc . . . ). Generally, reforming diesel fuel requires a higher power density which can be achieved by decreasing the diameter of the electrodes producing the plasma discharge in the plasmatron. The flexibility of a plasmatron reformer system according to the present invention allows the residence times of the reactants in a hot zone to be configured and optimized for multiple hydrocarbon fuels, including gasoline and diesel.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A fuel reformer system, comprising:
a plasmatron fuel reformer, wherein said plasmatron fuel reformer comprises a first fuel nozzle, at least one air nozzle and electrodes;
a first reaction extension region connected downstream from said plasmatron fuel reformer;
a supplemental nozzle section including a second fuel nozzle and a second air nozzle connected to said first reaction extension region; and
a second reaction extension region connected downstream from said supplemental nozzle section.

2. The fuel reformer system of claim 1, further including:
at least one additional nozzle section connected to said second reaction extension region.

3. The fuel reformer system of claim 1, further including:
at least one additional reaction extension region connected downstream from said second reaction extension region.

4. The fuel reformer system of claim 1, wherein said first reaction extension region has a length from approximately 2 cm to 8 cm and has a diameter from approximately 2 cm to 6 cm.

5. The fuel reformer system of claim 1, wherein plasma air is introduced through said at least one air nozzle that generates an air velocity in the range of approximately 25-100 m/s.

6. The fuel reformer system of claim 5, wherein the plasma air flow rate is in the range of approximately 15-60 liters/minute and hole diameters of said at least one air nozzle are in the range of approximately 0.03-0.07 inches.

7. The fuel reformer system of claim 1, wherein the distance between the first fuel nozzle and a plane half way between electrodes is approximately 0.2 inches.

8. The fuel reformer system of claim 1, wherein at least one catalyst is positioned in at least one of said reaction extension regions.

9. The fuel reformer system of claim 1, wherein a magnetic coil is positioned in said plasmatron fuel reformer to generate a magnetic field that shapes plasma in said plasma discharge region, and where the current flowing in the discharge is unipolar.

10. The fuel reformer system of claim 9, wherein the magnetic field both rotates the plasma and pushes it inward.

11. The fuel reformer system of claim 1, wherein said system is adapted to produce a temperature of hot gas exiting from the first reaction extension region that is at least 900° C.

12. The fuel reformer system of claim 1, wherein fuel atomization pressure in a nozzle used in the supplemental nozzle section is less than one-third of fuel atomization pressure in a nozzle used in the plasmatron fuel reformer.

13. The fuel reformer system of claim 1, where air is injected downstream from the first reaction extension region for preheating, and wherein a first stage including the plasmatron fuel reformer and the first reaction extension region operates at O/C ratios between partial oxidation and full combustion.

14. The fuel reformer system of claim 1, where fuel is injected downstream from the first reaction extension region for preheating, and wherein a first stage including the plasmatron fuel reformer and the first reaction extension region operates at O/C ratios between partial oxidation and full combustion.

15. The fuel reformer system of claim 1, wherein fuel and air are injected downstream from the first reaction extension region for preheating, and wherein a first stage including the plasmatron fuel reformer and the first reaction extension region operates at O/C ratios between partial oxidation and full combustion, and a second stage including the supplemental nozzle section and the second reaction extension region operates, though control of air/fuel injection in the first and second stage, at conditions of low turbulence and poor mixing in order to generate a warm combustible mixture.

16. The fuel reformer system of claim 1, further comprising a turbulizer disposed downstream from the first reaction extension region and that generates turbulence.

17. The fuel reformer system of claim 1, where a first stage including the plasmatron fuel reformer and the first reaction extension region operates at conditions of non-uniformity of air/fuel mixture, wherein control of turbulence for plasmatron operation is provided through control of the ratio of the mixing time to residence time, and wherein a second stage including the supplemental nozzle section and the second reaction extension region generates flow patterns that when injected into the main flow result in turbulence.

18. The fuel reformer system of claim 17, wherein the turbulence in the second extension reaction cylinder is provided by the generation of a swirl motion in the second air/fuel mixture that is opposite to a swirl motion of gas in the first stage.

19. The fuel reformer system of claim 17, further comprising a separator element between the flow in the first stage and the second stage.

20. The fuel reformer system of claim 19, wherein said separator element is also a thermal element such that heat deposited by the flow mixture in the first stage is used for preheating the air and/or the fuel injected in the second stage.

21. The fuel reformer system of claim 1, wherein at the low flow rates electrical power delivered to the plasmatron fuel reformer is decreased by decreasing the current of a power supply.

22. The fuel reformer system of claim 1 wherein at the low flow rates electrical power delivered to the plasmatron fuel reformer is decreased by pulsing a power supply at low duty cycle operation.

23. The fuel reformer system of claim 1, wherein the O/C ratio in a first stage including the plasmatron fuel reformer and the first reaction extension region is between approximately 2 and 7.

24. The fuel reformer system of claim 1, wherein said system is adapted for operation with gasoline.

25. The fuel reformer system of claim 1, wherein said system is adapted for operation with diesel.

26. The fuel reformer system of claim 1, wherein said system is adapted for operation with any liquid hydrocarbon.

* * * * *